(12) United States Patent
Lesperance et al.

(10) Patent No.: US 9,090,348 B2
(45) Date of Patent: Jul. 28, 2015

(54) PORTABLE CONTROL SYSTEM FOR ROTARY-WING AIRCRAFT LOAD MANAGEMENT

(75) Inventors: Jesse J. Lesperance, Madison, AL (US); Thomas Zygmant, Southport, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 302 days.

(21) Appl. No.: 13/425,546

(22) Filed: Mar. 21, 2012

(65) Prior Publication Data

US 2013/0248648 A1    Sep. 26, 2013

(51) Int. Cl.
G05D 1/00    (2006.01)
B64D 1/22    (2006.01)

(52) U.S. Cl.
CPC .............. B64D 1/22 (2013.01); G05D 1/0016 (2013.01); B64C 2201/128 (2013.01); B64C 2201/146 (2013.01)

(58) Field of Classification Search
CPC .............. B64D 1/22; B64C 2201/146; B64C 2201/128
USPC .................................... 244/137.4, 190; 701/2
See application file for complete search history.

(56) References Cited

U.S. PATENT DOCUMENTS

| | | | |
|---|---|---|---|
| 2,649,262 A * | 8/1953 | Fahrney ............................. 244/3 |
| 5,015,187 A * | 5/1991 | Lord ................................. 434/33 |
| 5,465,925 A * | 11/1995 | Connolly et al. .......... 244/137.1 |
| 6,289,817 B1 * | 9/2001 | Quebral et al. ............... 102/357 |
| 6,755,716 B2 * | 6/2004 | Agostini et al. .............. 446/435 |
| 7,318,564 B1 * | 1/2008 | Marshall ......................... 244/58 |
| 7,397,363 B2 | 7/2008 | Joao |
| 7,398,946 B1 * | 7/2008 | Marshall ......................... 244/58 |
| 7,407,424 B2 * | 8/2008 | Choi ............................... 446/37 |
| 7,581,702 B2 | 9/2009 | Olson et al. |
| 7,789,341 B2 * | 9/2010 | Arlton et al. .............. 244/17.23 |
| 7,831,351 B1 | 11/2010 | Hofer et al. |
| 7,845,263 B1 * | 12/2010 | Miller ........................... 89/1.56 |
| 8,178,825 B2 * | 5/2012 | Goossen et al. ............ 244/3.14 |
| 8,200,375 B2 * | 6/2012 | Stuckman et al. ................. 701/2 |
| 8,214,088 B2 * | 7/2012 | Lefebure .......................... 701/2 |
| 8,342,440 B2 * | 1/2013 | Papanikolopoulos et al. .... 244/2 |
| 8,380,368 B2 * | 2/2013 | Stuckman et al. ................. 701/3 |
| 8,457,809 B2 * | 6/2013 | Lee et al. .......................... 701/2 |
| 2007/0200032 A1 * | 8/2007 | Eadie et al. ................. 244/137.4 |
| 2008/0201024 A1 | 8/2008 | Matos |
| 2008/0203231 A1 * | 8/2008 | Taya ............................. 244/190 |
| 2009/0284553 A1 * | 11/2009 | Seydoux ....................... 345/649 |
| 2010/0001139 A1 * | 1/2010 | Humbert et al. ........... 244/137.4 |
| 2010/0062817 A1 * | 3/2010 | Seydoux .......................... 463/6 |

(Continued)

Primary Examiner — Brian M O'Hara
Assistant Examiner — Michael Kreiner
(74) Attorney, Agent, or Firm — Cantor Colburn LLP

(57) ABSTRACT

A control system for portable control of a rotary-wing aircraft includes a portable, hand-held, control device executing a control application, the control device operating in a loaded mode when a load is attached to the rotary-wing aircraft and an unloaded mode when no load is attached to the rotary-wing aircraft, the control device presenting command icons in response to being in loaded mode and unloaded mode; a vehicle management system in the rotary-wing aircraft; a sensor package on the rotary-wing aircraft; and a communication system providing communications between the control device and the rotary-wing aircraft, vehicle management system and sensor package; wherein the control device communicates commands to the vehicle management system to implement loading and unloading of the rotary-wing aircraft.

19 Claims, 15 Drawing Sheets

(56) References Cited

U.S. PATENT DOCUMENTS

| | | |
|---|---|---|
| 2010/0084513 A1 | 4/2010 | Gariepy et al. |
| 2010/0193639 A1* | 8/2010 | Spencer et al. ............ 244/137.4 |
| 2012/0088427 A1* | 4/2012 | Nguyen .......................... 446/37 |
| 2013/0248648 A1* | 9/2013 | Lesperance et al. ........ 244/17.13 |
| 2014/0008496 A1* | 1/2014 | Ye et al. ......................... 244/190 |
| 2014/0132528 A1* | 5/2014 | Catton .......................... 345/173 |

* cited by examiner

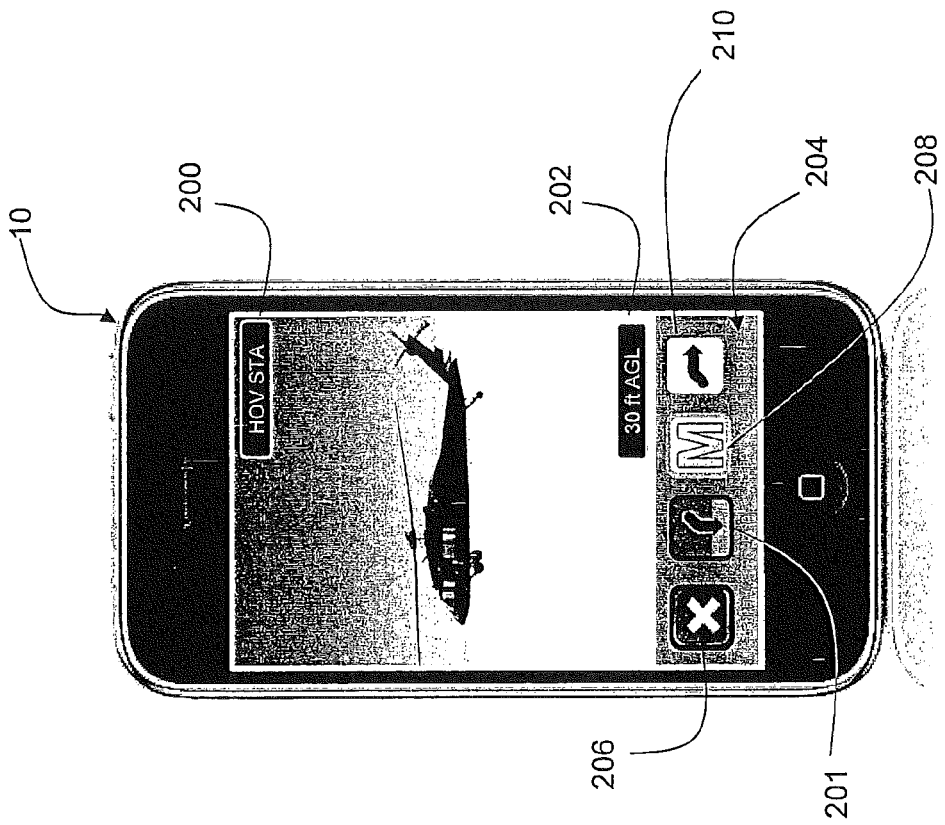
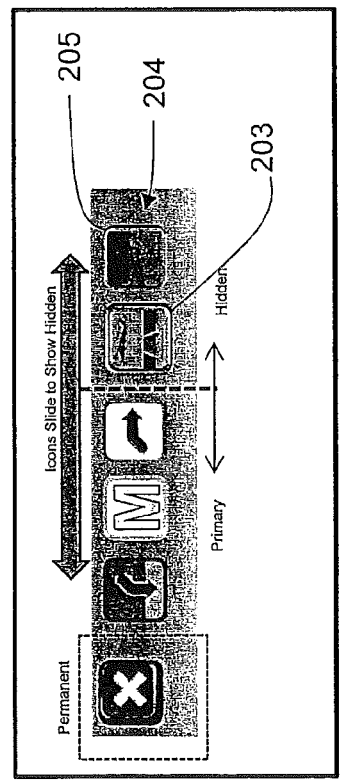
Figure 7
Figure 7A

When no load is attached icons

When no load is attached

When load is attached icons

When no load is attached icons

When load is attached icons

PORTABLE CONTROL SYSTEM FOR ROTARY-WING AIRCRAFT LOAD MANAGEMENT

BACKGROUND

The subject matter disclosed herein relates generally to remote control of rotary-wing aircraft, and more particularly to a portable control system for rotary-wing aircraft load management.

Often it is desirable to provide remote, portable control of an aircraft. Existing ground control stations for unmanned aircraft employ bulky ground control stations including humvees and man wearable equipment. These systems, for a re-supply operation, for example, require the pick-up zone and receiving zone operators to have dedicated systems. It would be beneficial to provide a ground control system using a more ubiquitous control interface to facilitate and simplify remote control of aircraft, and in particular rotary-wing aircraft load management.

SUMMARY

One embodiment includes a control system for portable control of a rotary-wing aircraft, the control system including a portable, hand-held, control device executing a control application, the control device operating in a loaded mode when a load is attached to the rotary-wing aircraft and an unloaded mode when no load is attached to the rotary-wing aircraft, the control device presenting command icons in response to being in loaded mode and unloaded mode; a vehicle management system in the rotary-wing aircraft; a sensor package on the rotary-wing aircraft; and a communication system providing communications between the control device and the rotary-wing aircraft, vehicle management system and sensor package; wherein the control device communicates commands to the vehicle management system to implement loading and unloading of the rotary-wing aircraft.

Other aspects, features, and techniques of the invention will become more apparent from the following description taken in conjunction with the drawings.

BRIEF DESCRIPTION OF THE DRAWINGS

Referring now to the drawings wherein like elements are numbered alike in the several Figures, in which:

FIGS. 7 and 7A depict a human-machine interface on a control device in an exemplary embodiment in a hover stationary (HOV STA) mode;

DETAILED DESCRIPTION

Figure 1:
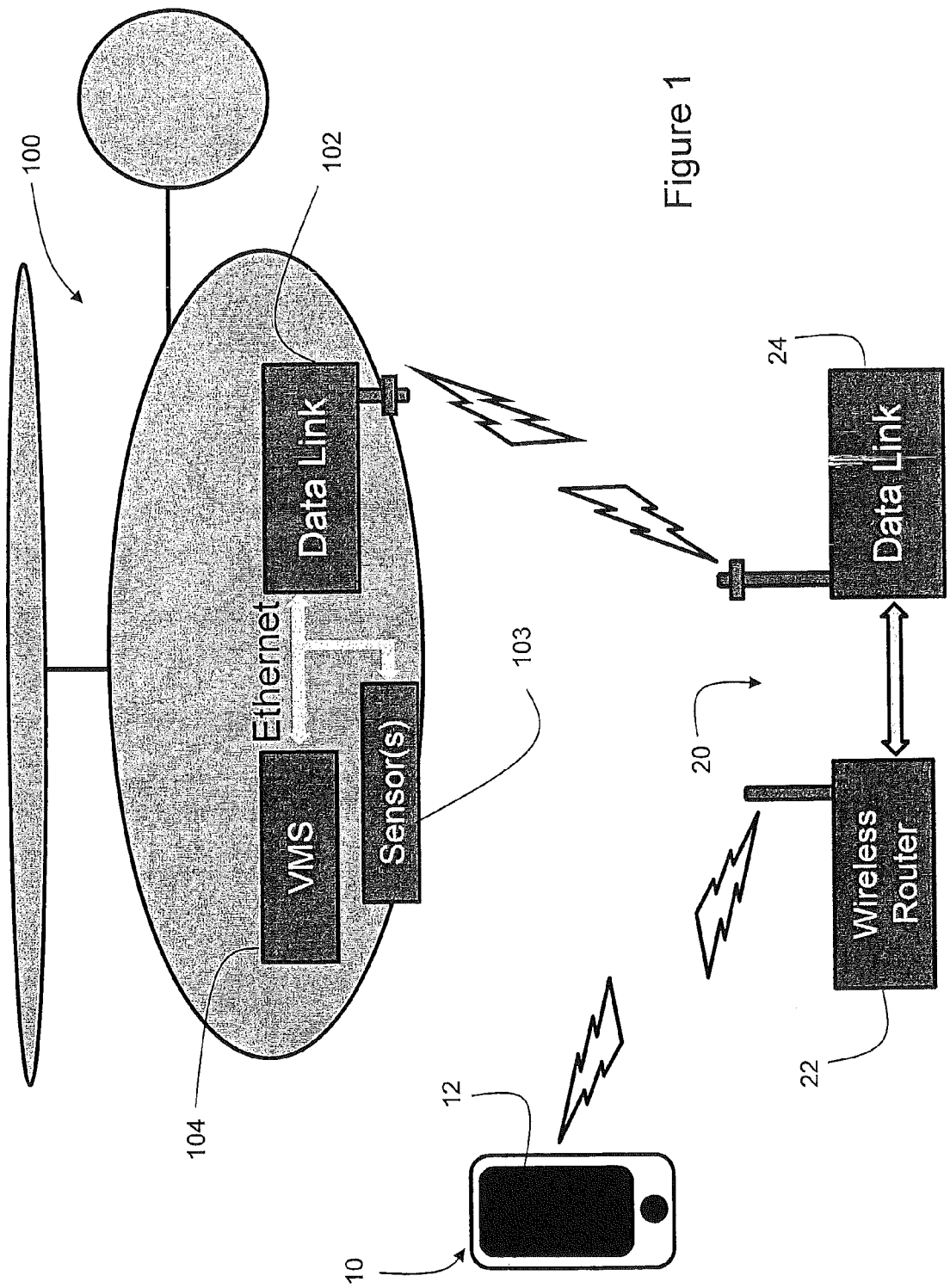
FIG. 1 depicts a control system architecture in an exemplary embodiment.

Embodiments relate to systems and methods for providing control of rotary-wing aircraft, and in particular, to control of loading and unloading of loads to and from the rotary-wing aircraft. FIG. 1 depicts a control system architecture in an exemplary embodiment. The control system includes a control device 10 for controlling a rotary-wing aircraft (e.g., helicopter) 100. Control device 10 may be a portable, hand-held, microprocessor-based device having a display screen 12 that provides for a human-machine interface. The processor of control device 10 executes a control application to interface with rotary-wing aircraft 100. Control device 10 also includes wireless communications functionality as described in detail herein. Exemplary devices that may serve as control device 10 include tablet computers, personal digital assistants, mobile phones, media players, etc.

In the embodiment shown in FIG. 1, control device 10 communicates with rotary-wing aircraft 100 via a communication system 20. Communication system 20 includes a wireless router 22 and wireless data link 24. Wireless router 22 communicates back and forth with control device 10 using known wireless communications protocols. Communications may use packet-based, single channel communications techniques, such as 802.11 standards, also referred to as Wi-Fi. Wireless router 22 is in bidirectional communication with data link 24 via a network connection (e.g., Ethernet). Wireless data link 24 uploads and downloads data to and from rotary-wing aircraft 100 using known uplink/downlink technologies, such as C/L/S/K/Ku-band wireless data links.

The rotary-wing aircraft 100 includes a data link 102 in bidirectional communication with data link 24. Data link 102 is coupled to a vehicle management system (VMS) 104 via a network connection (e.g., Ethernet) and a sensor package 103. Sensor package 103 provides video or equivalent data to a main or parallel data link system. VMS 104 controls rotary-wing aircraft 100. VMS 104 also collects flight status data from rotary-wing aircraft 100. As described in further detail herein, flight status data from the VMS 104 is provided to control device 10, and commands from control device 10 are provided to the VMS 104 to control the rotary-wing aircraft 100.

Figure 2:
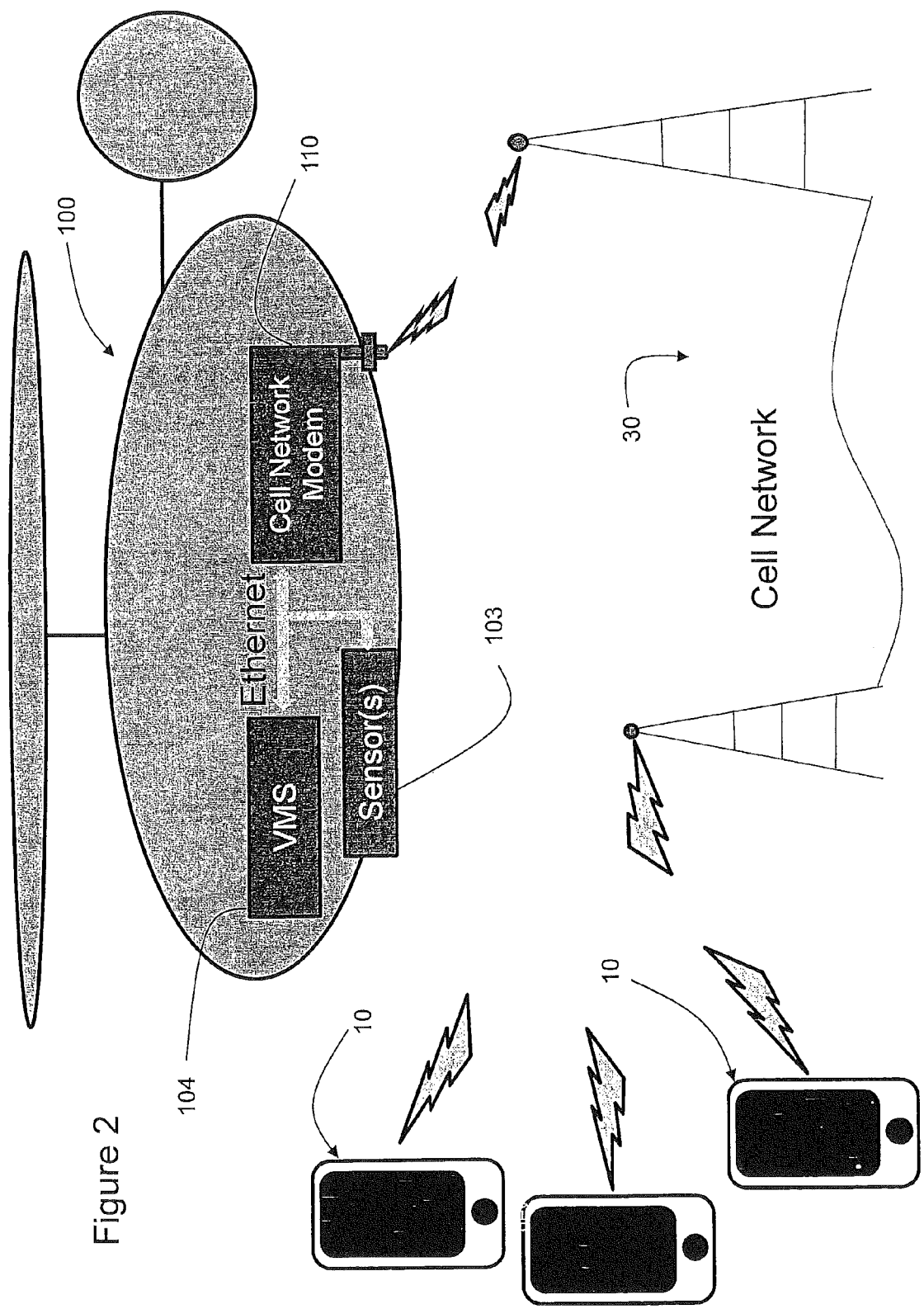
FIG. 2 depicts a control system architecture in another exemplary embodiment.

FIG. 2 depicts a control system architecture in another exemplary embodiment. In the embodiment of FIG. 2, the control device communication system is implemented using a cellular network 30. The rotary-wing aircraft 100 includes a cellular network modem 110 in communication with the VMS 104 via a network connection (e.g., Ethernet). In this embodiment, bidirectional communication between control device 10 and rotary-wing aircraft 100 occurs over cellular network 30.

Figure 3:
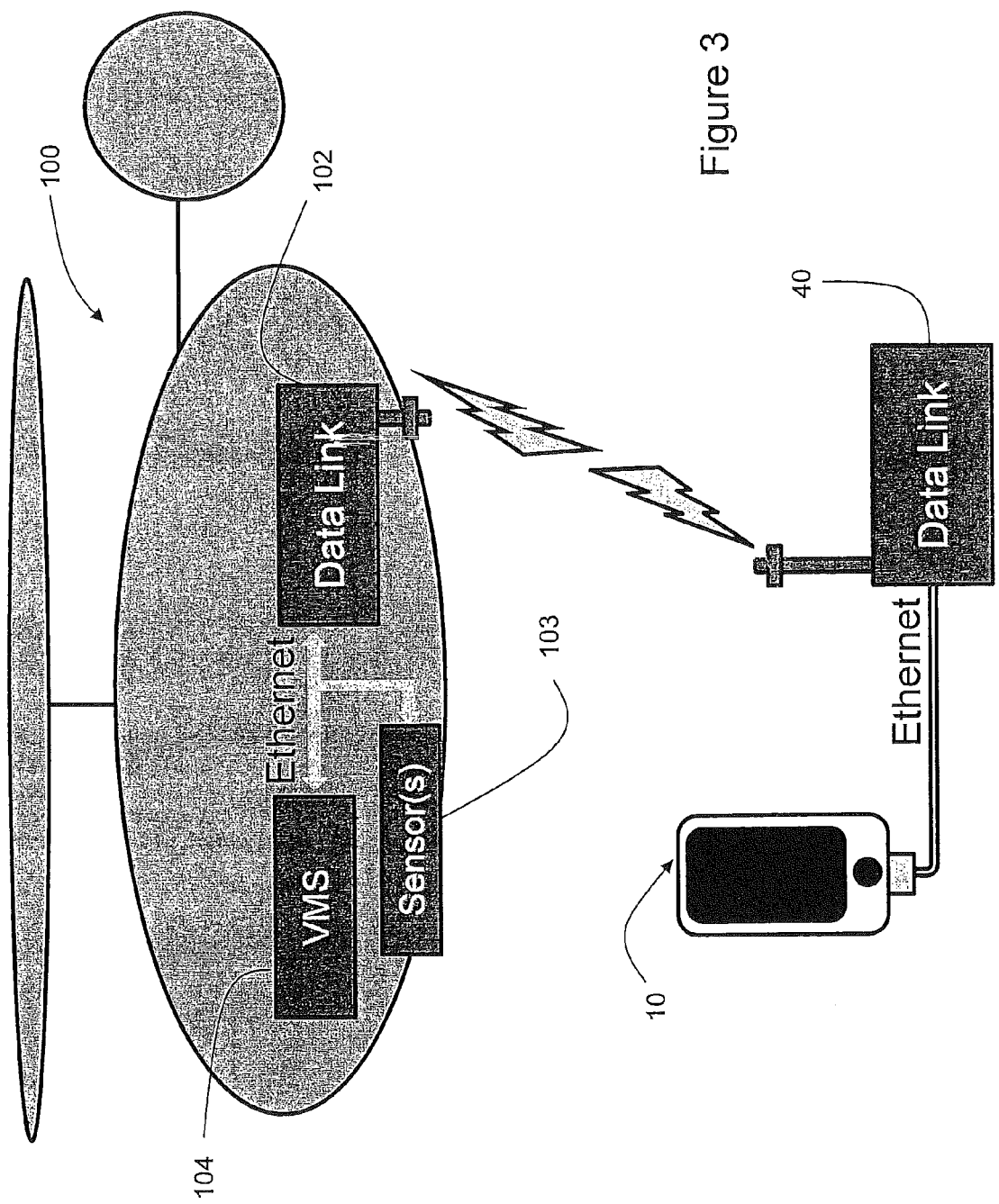
FIG. 3 depicts a control system architecture in another exemplary embodiment.

FIG. 3 depicts a control system architecture in another exemplary embodiment. In the embodiment of FIG. 3, the control device communication system is implemented using a data link 40 coupled directly to the control device 10 via a wired network connection (e.g., Ethernet). The rotary-wing aircraft 100 includes a data link 102 in bidirectional communication with data link 40. Data link 102 is coupled to a Vehicle Management System (VMS) 104 and to a sensor package 103 via a network connection (e.g., Ethernet).

Figure 4:
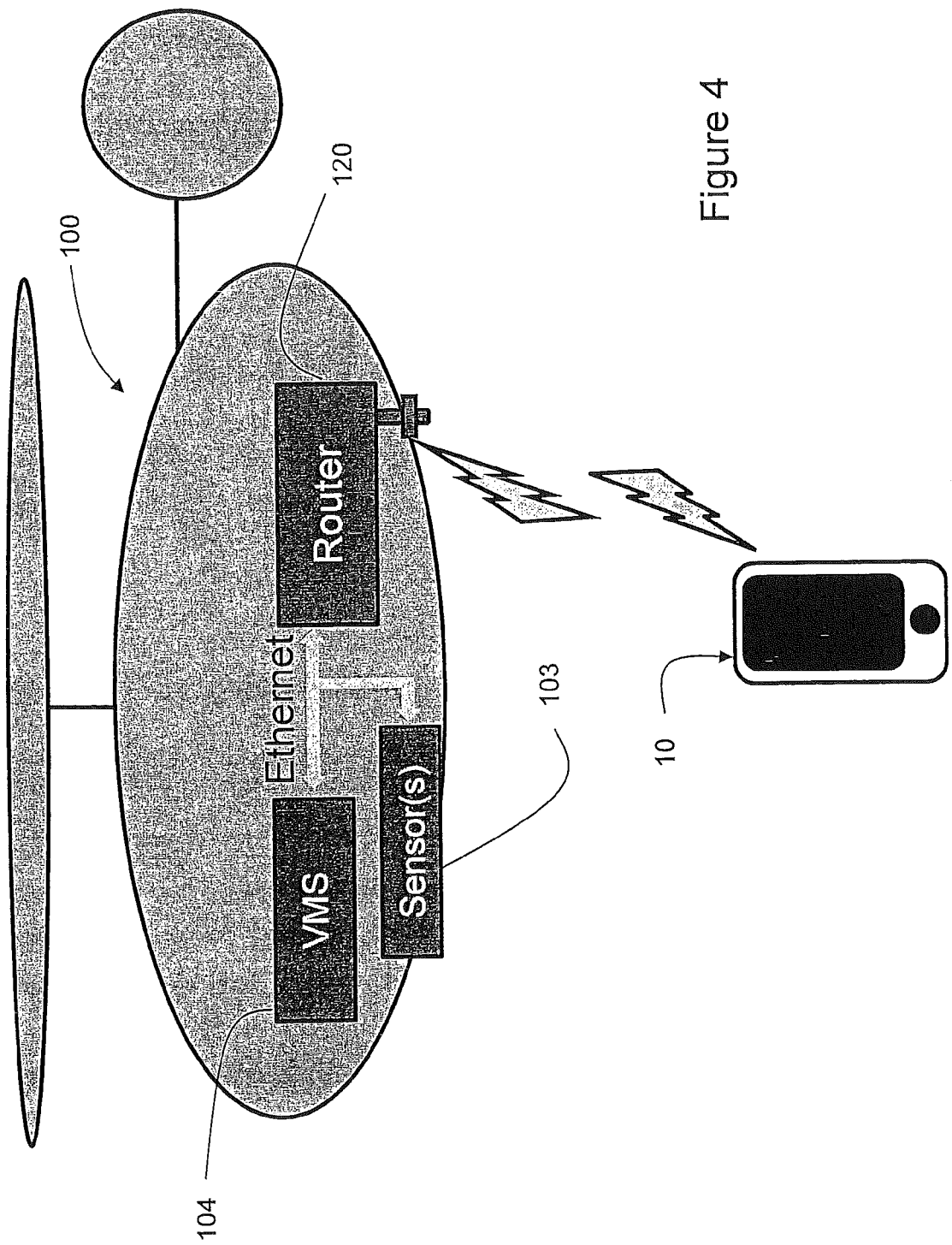
FIG. 4 depicts a control system architecture in another exemplary embodiment.

FIG. 4 depicts a control system architecture in another exemplary embodiment. In the embodiment of FIG. 4, the control device communication system is implemented using a wireless communication element of the control device 10 directly. The communication element may use packet-based, single channel communications techniques, such as 802.11 standards, also referred to as Wi-Fi. The rotary-wing aircraft 100 includes wireless router 120 using the same communications standard as the control device 10. Wireless router 120 is in bidirectional communication with control device 10. Wireless router 120 is coupled to a vehicle management system (VMS) 104 and to a sensor package 103 via a network connection (e.g., Ethernet).

Figure 5:
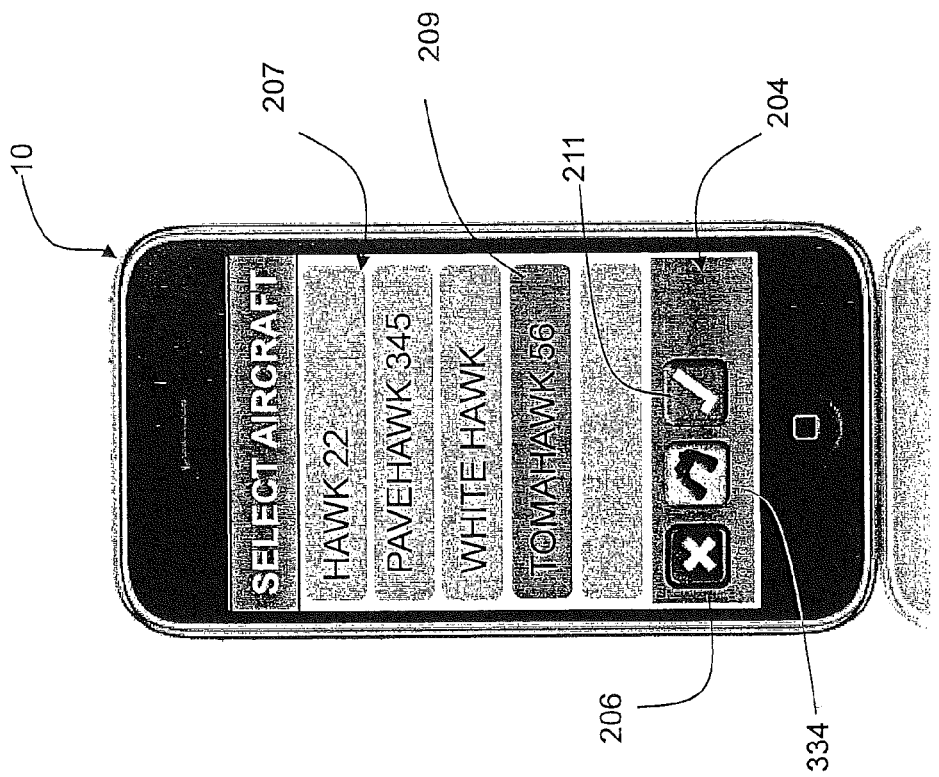
FIG. 5 depicts a human-machine interface on a control device in an exemplary embodiment in a first mode.

FIG. 5 depicts a human-machine interface on a control device 10 in an exemplary embodiment in a receive aircraft mode of a first mode. The human-machine interface will include an available aircraft list 207 of those within range by selecting find aircraft icon 334. The find aircraft icon 334 searches the area for local rotary-wing aircraft 100 and provides a selection of available aircraft to choose from (e.g., Bluetooth pairing). Upon selection of a rotary-wing aircraft 100 from the aircraft list 207, the selection will be highlighted 209 and then either confirmed 211 or canceled 206 via the human-machine interface command icons 204. Another method for aircraft acquisition is a push. In a push operation, an aircraft available notification appears when a rotary-winged aircraft 100 is within range or handoff from main operator of the aircraft is pushed to the control device 10. The operator of the portable control device 10 would then confirm/accept the rotary-winged aircraft 100 to complete the push transaction.

Figure 6:
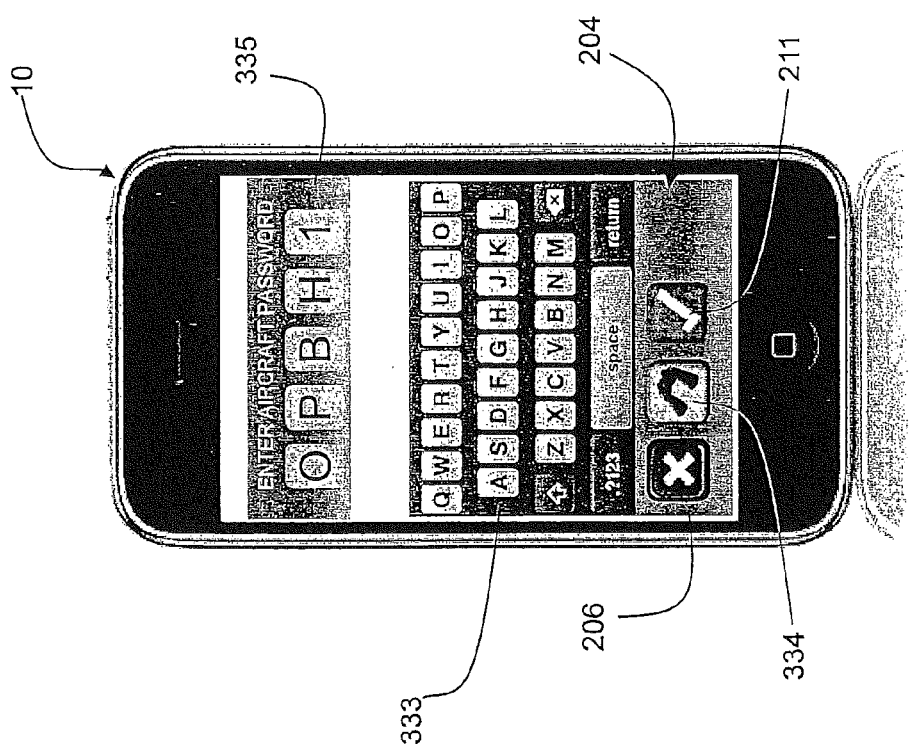
FIG. 6 depicts a human-machine interface on a control device in an exemplary embodiment in a first mode.

FIG. 6 depicts a human-machine interface on a control device 10 in an exemplary embodiment in an access code mode of the first mode. In the first mode, the user of control device 10 is attempting to obtain access to aircraft control. Control device 10 enters an access code mode. The human-machine interface includes a keyboard 333 for entering characters of the access password. The human-machine interface will include a text bar 335 that displays the password as entered via the keyboard 333. After a rotary-wing aircraft 100 is chosen, and the password for the specific aircraft is entered, selection of the return icon or confirm 211 will send the password from the control device 10 to the rotary-winged aircraft 100 for verification. Referring to FIG. 6, selection of cancel icon 206 cancels access of the rotary-wing aircraft 100 by control device 10. Acceptance by the rotary-winged aircraft 100 initiates second mode screen or if access denied, reverts back to find aircraft screen FIG. 6 and provides incorrect password notification. As shown in FIG. 6, the command icons 204 also include the cancel icon 206 as well as the find aircraft icon 334.

FIGS. 7 and 7A depicts a human-machine interface on a control device 10 in an exemplary embodiment in a hover stationary mode. The mode depicted in FIG. 7 is referred to as hover-stationary, meaning the rotary-wing aircraft 100 is hovering at a set location. The human-machine interface includes a status icon 200 indicating the current mode of control device 10 and rotary-wing aircraft 100. Status information 202 may be presented, and include flight status information such as altitude, speed, heading, etc. This flight status information is communicated to control device 10 from VMS 104. Command icons 204 are also presented in the human-machine interface. Upon selection of one of the command icons 204, control device 10 issues commands to the rotary-wing aircraft 100 to execute an operation. Command icons 204 in FIGS. 7 and 7A include a cancel icon 206, selection of which cancels current action of the rotary-wing aircraft 100 by control device 10. Command icons 204 also include a hover manual icon 208, selection of which places control device 10 and rotary-wing aircraft 100 into a mode for manually controlling the rotary-wing aircraft 100. The command icons 204 also include an enroute icon 210, selection of which causes the rotary-wing aircraft 100 to follow a preloaded flight plan, stored either in the VMS 104 or in the control device 10. The commands icons 204 also include a land icon 201, selection of which causes the rotary-wing aircraft 100 to autonomously execute a landing at its current lat/long. Command icons 204 may require a confirmation as described with reference to FIG. 8 to proceed with the given commands.

FIG. 7A shows additional command icons 204 and a slide feature to display hidden command icons. In all states, cancel 206 is a fixed icon and available at all times. The other three available icon spaces can be scrolled. In addition to land 201, hover manual 208, and enroute 210, hover stationary provides video 203 and sensor 205 icons for additional functionality. The video 203 and sensor 205 icons obtain real-time streaming video or sensor data from the rotary-wing aircraft 100 to the control device 10 for situational awareness. The video 203 and sensor 205 modes are available in a number of modes, such as hover manual and ground, as described further herein.

Figure 8:
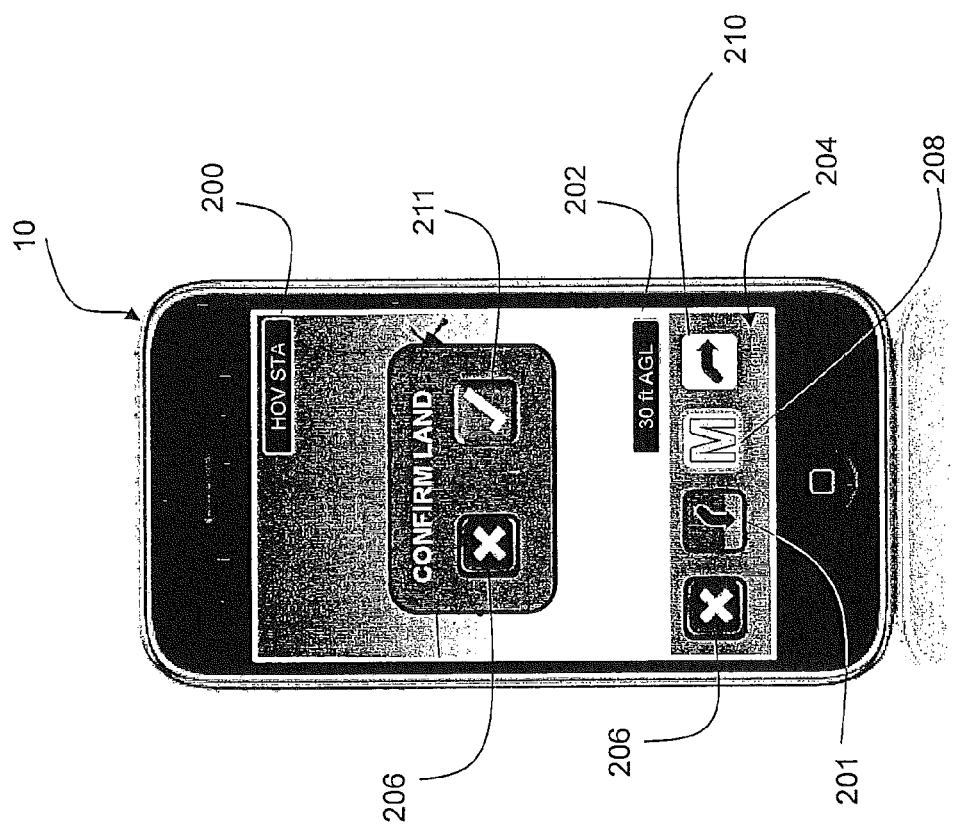
FIG. 8 depicts a human-machine interface on a control device in an exemplary embodiment in a hover stationary mode.

Upon selection of land 201, the control device 10 will ask for confirmation as shown in FIG. 8. The human machine interface will provide the option to confirm 211 or cancel 206 the last command. A confirm 211 will send the command to the rotary wing aircraft 100 for verification prior to execution.

Figure 9:
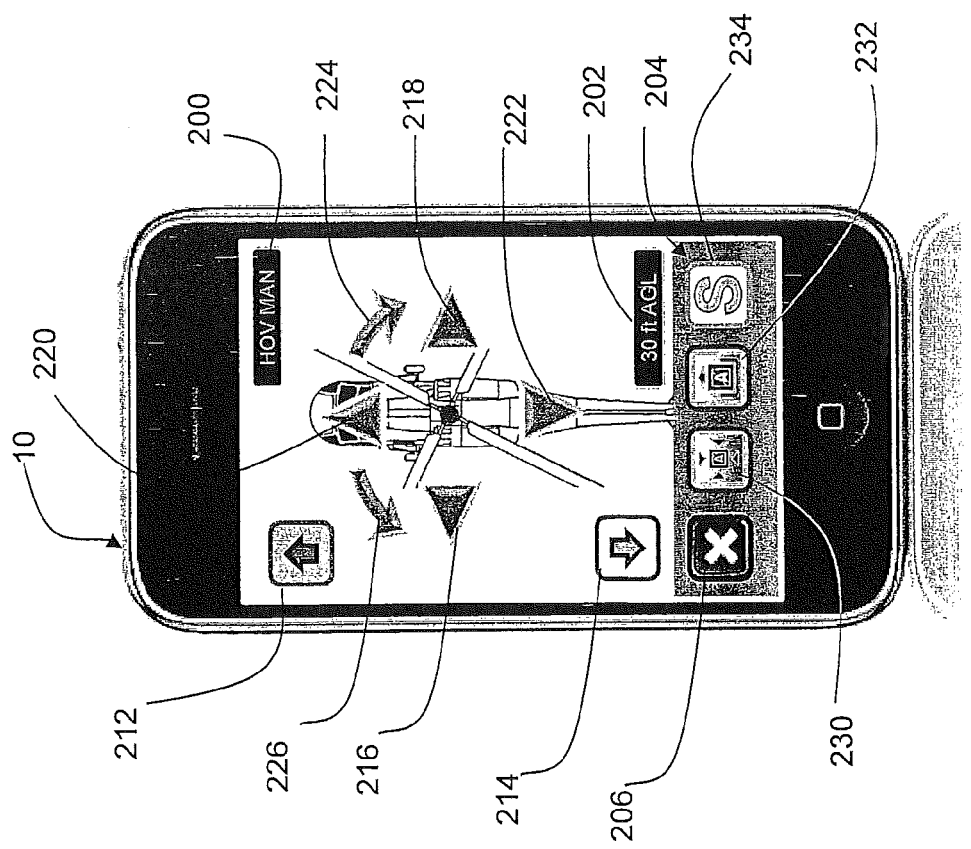
FIGS. 9 and 9A depict a human-machine interface on a control device in an exemplary embodiment in a hover manual (HOV MAN) mode, with no load attached.
Figure 9A:
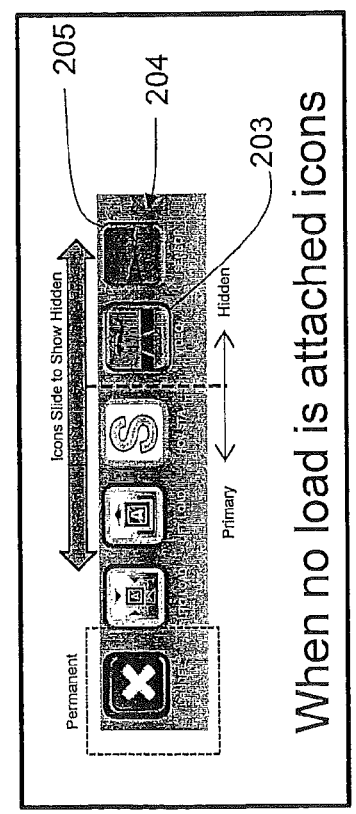

FIGS. 9 and 9A depict a human-machine interface on a control device 10 in an exemplary embodiment in the hover manual mode, entered upon selection of the hover manual icon 208 in FIG. 7. The command icons 204 are updated to reflect currently available operations. The hover manual mode is designated by status icon 200. A number of flight control icons are presented. Altitude control icons include an up icon 212 and down icon 214 to control height of the rotary-wing aircraft 100. Selection of the up icon 212 or down icon 214 may cause a change in altitude based on a number of feet per selection (e.g., 2 feet per click) or continuous transition at a predetermined rate for as long as it is held (with limits defined by the VMS 104). Position control icons include left icon 216, right icon 218, forward icon 220 and back icon 222. Selection of the position control icons causes a change in position based on a number of feet per selection (e.g., 2 foot per click) or continuous transition at a predetermined rate for as long as it is held (maintain travel as icon is held). Heading control icons include rotational icons including clockwise rotation icon 224 and counter-clockwise rotation icon 226. Selection of the rotational icons causes a change in heading, such as a number of degrees per selection or continuous yaw change at a predetermined rate.

Command icons 204 are updated once the control device 10 enters hover manual mode. As shown in FIGS. 9 and 9A, the command icons include cancel icon 206, auto load icon 230, lift load icon 232, hover stationary icon 234, video/sensor icons 203/205. Other icons may be added if needed. The command icons 204 are generated dependent upon whether the rotary-wing aircraft 100 currently has an auto load system attached, is secured to a load, or is not secured to a load. Cancel 206 is always available. The other command icons 204 slide to show the commands that cannot fit in the default menu (e.g., three commands) and are as a result hidden (such as the video/sensor icons 203/205). The command icons in FIGS. 9 and 9A are presented when no load is detected by the VMS 104.

FIGS. 9 and 9A depict a human-machine interface on a control device in an exemplary embodiment in a hover manual mode, in which a load is not attached to the rotary-wing aircraft 100. In FIGS. 9 and 9A, selection of cancel icon 206 cancels control of the rotary-wing aircraft 100 by control device 10 and transitions the aircraft to hover stationary mode. Selection of hover stationary icon 234 causes the control device 10 to enter hover stationary mode, with rotary-wing aircraft 100 hovering at a fixed position. The auto load icon 230 causes the VMS 104 to execute a flight control process that automatically positions the rotary-wing aircraft 100 over a load. The load may be manually or automatically secured to rotary-wing aircraft 100. Once the load is secured, the lift load icon 232 can be selected to cause the rotary-wing aircraft 100 to lift the load to a predetermined height and hover. This entire process can be done autonomously via the selection of the Auto Load icon 230 (i.e. autonomous load systems attached). Video/Sensor icon 203/205 initiates a sub-category of the current third mode. Video/Sensor icons 203/205 will access data from a sensor/video devices 103 on the rotary-winged aircraft 100 and display it on the human-machine interface of the control device 10.

Figures 10, 10A:
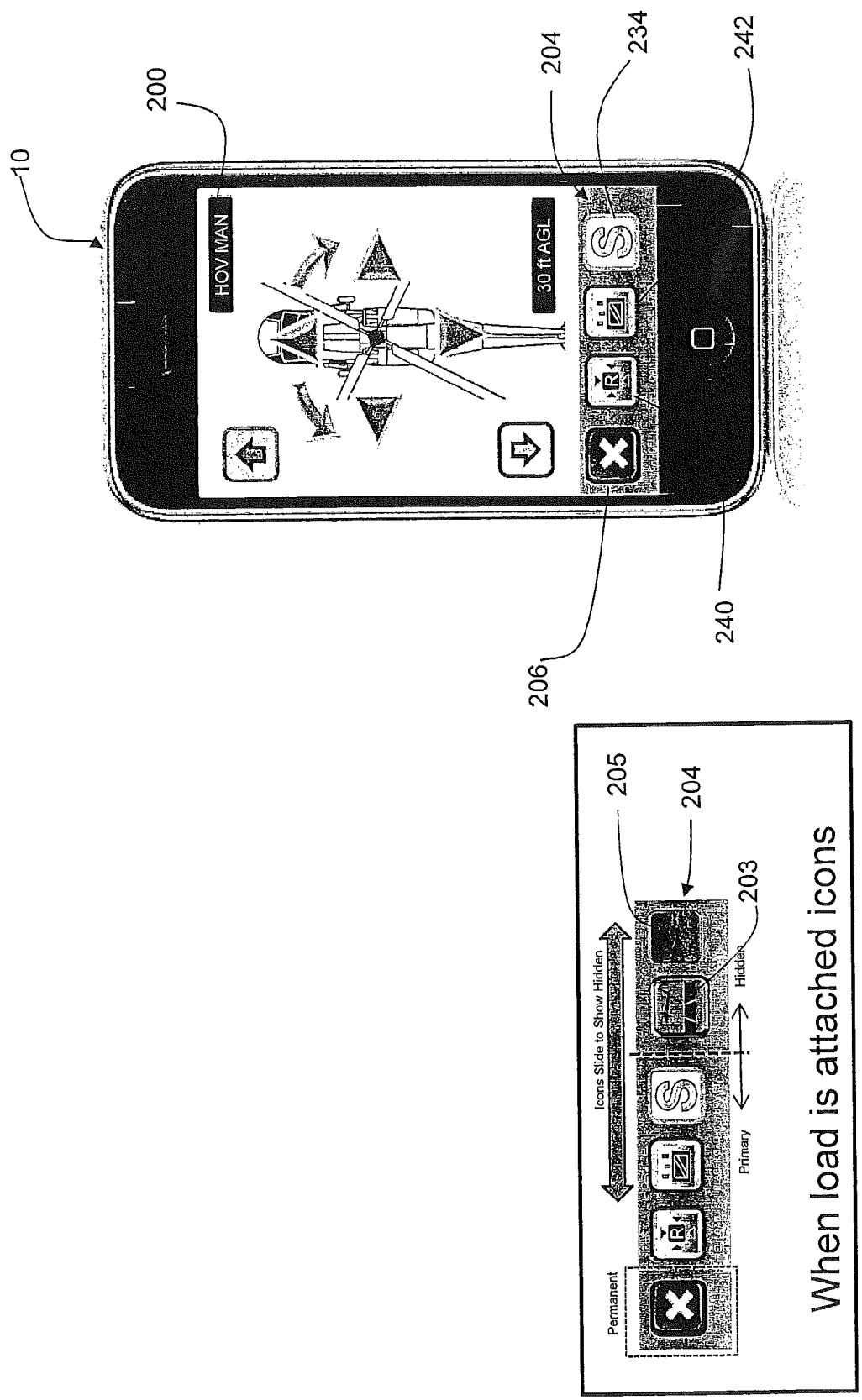
FIGS. 10 and 10A depict a human-machine interface on a control device in an exemplary embodiment in the hover manual (HOV MAN) mode with a load attached.

FIGS. 10 and 10A depict a human-machine interface on a control device in an exemplary embodiment, in hover manual mode in which a load is attached to the rotary-wing aircraft 100. As noted above, the command icons 204 are updated to reflect currently available operations, based on flight information received from the VMS 104. The command icons 204 include cancel icon 206, release load icon 240, place load icon 242 and hover stationary icon 234. Selection of cancel icon 206 cancels control of the rotary-wing aircraft 100 by control device 10. Selection of hover stationary icon 234 causes the rotary-wing aircraft 100 to enter hover stationary mode, with rotary-wing aircraft 100 hovering at a fixed position. Selection of the place load icon 242 causes the rotary-wing aircraft 100 to rest the load on the ground. Selection of the release load icon 240 causes the rotary-wing aircraft 100 to lower the load to the ground at the current aircraft position and release the load from the rotary-wing aircraft 100 (e.g., release a sling attachment, open hook, open auto load device) whereas place load 242 lowers the load to the ground at the current aircraft position, but does not release the load. Video/sensor icons 203/205 will access video or sensor data from sensor/video devices on the rotary-winged aircraft 100 and display it on the human-machine interface of the control device 10.

Figure 11:
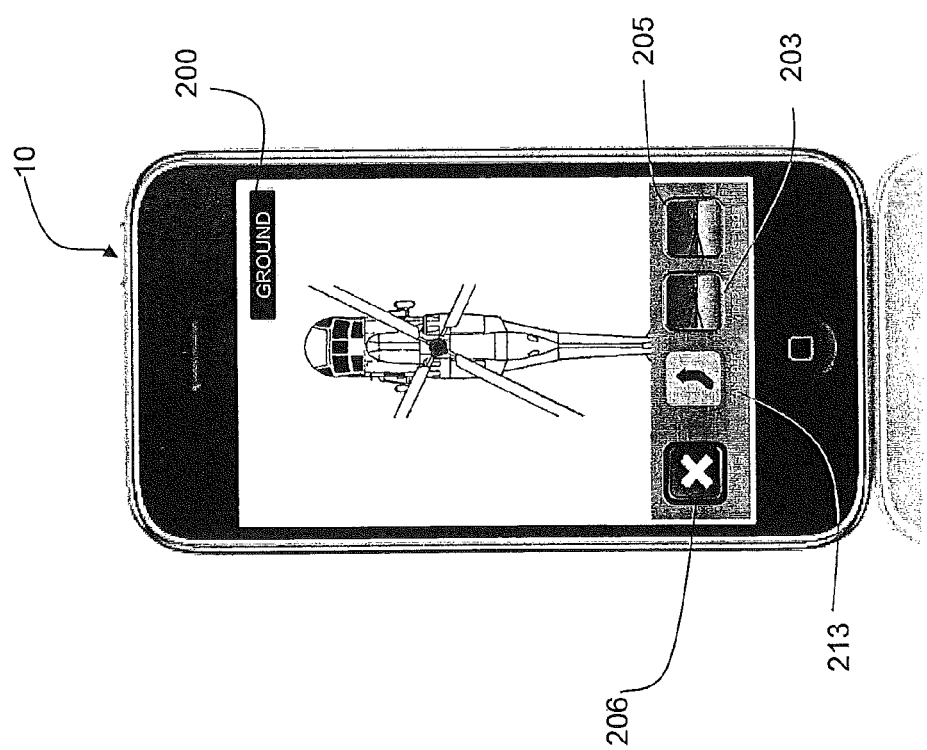
FIG. 11 depicts a human-machine interface on a control device in an exemplary embodiment in a ground mode.

FIG. 11 depicts a human machine interface on a control device 10 in an exemplary embodiment in a ground mode. The command icons 204 displayed across the bottom of the human machine interface include cancel 206, take off 213, video 203 and sensor 205. Video 203 and sensor 205 commands activate an onboard video/sensor devices 103 on the rotary-wing aircraft 100 and transmit the data to the control device 10 where it is displayed for the operator. Take off 213 will send a command to the aircraft to transition from ground mode to hover stationary. Selection of cancel icon 206 cancels control of the rotary-wing aircraft 100 by control device 10.

Figure 12:
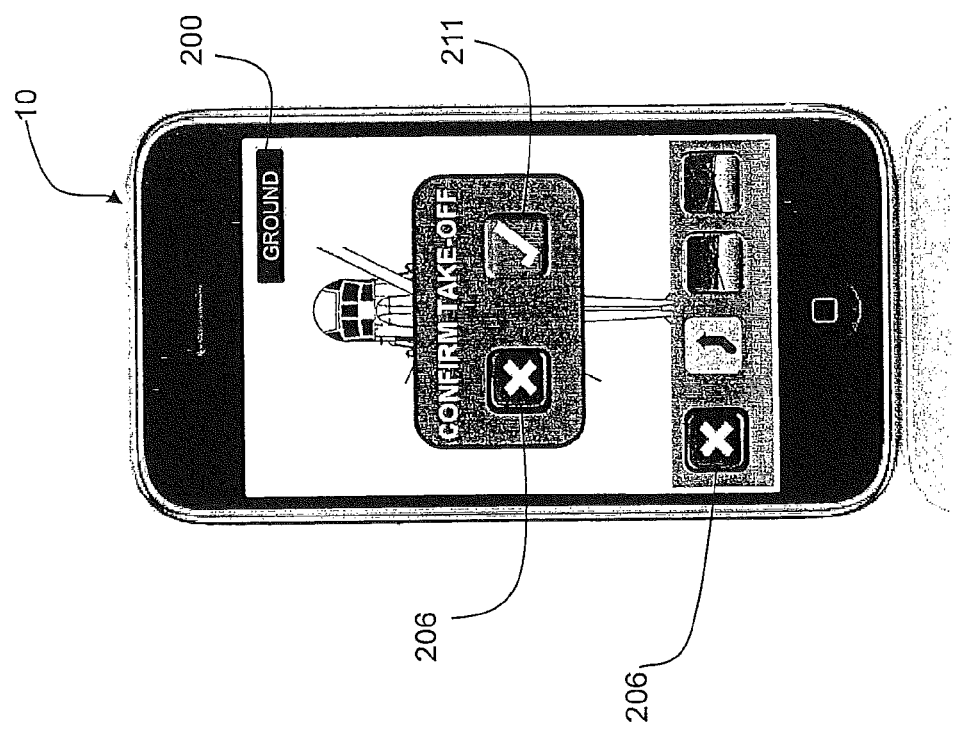
FIG. 12 depicts a human-machine interface on a control device in an exemplary embodiment in a ground mode.

Upon selection of takeoff 213, the control device 10 will ask for confirmation as shown in FIG. 12. The human machine interface will provide the option to confirm 211 or reject 206 the last command. A confirm 211 will send the takeoff command to the aircraft for verification by the VSM 104 prior to commanding the rotary-wing aircraft to transition from ground mode to hover stationary at a predetermined altitude.

Figure 13:
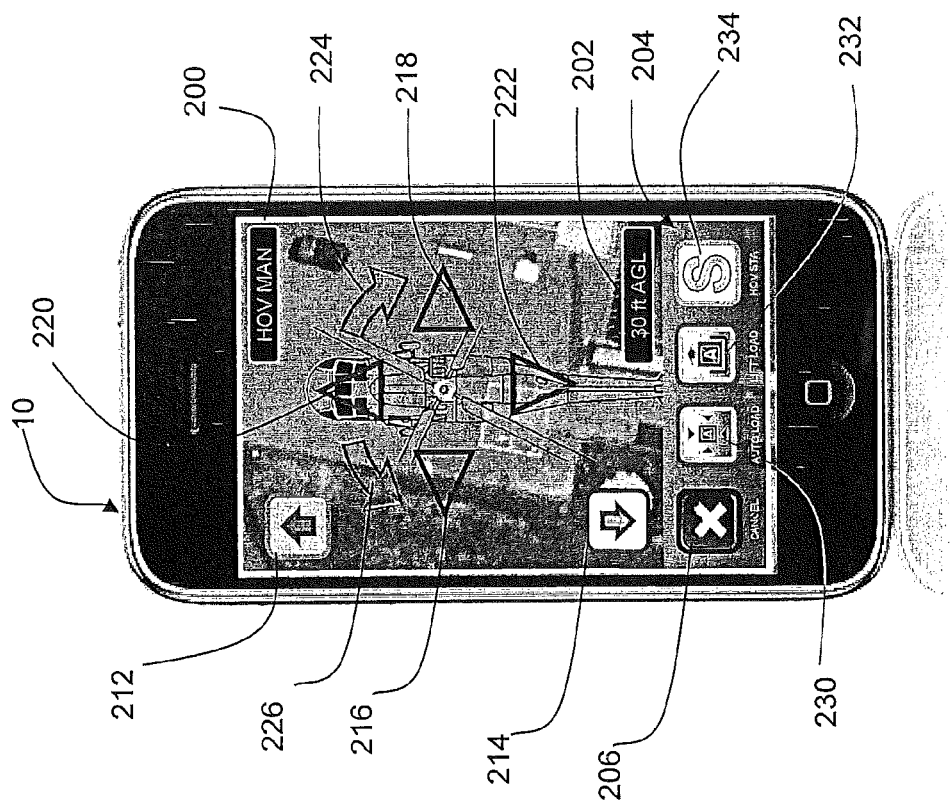
FIGS. 13, 13A and 13B depict a human-machine interface on a control device in an exemplary embodiment in a hover manual mode.
Figure 13A:
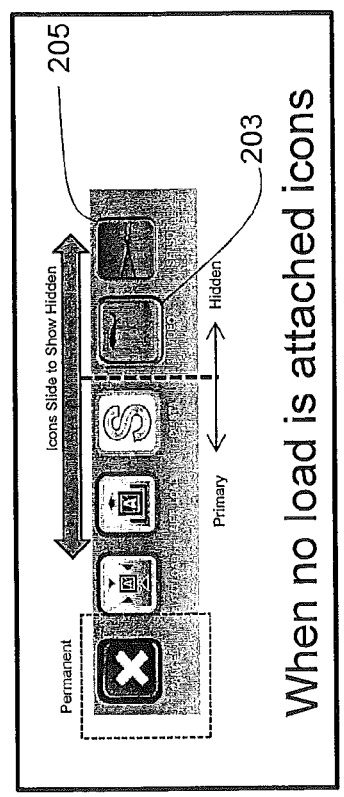
Figure 13B:
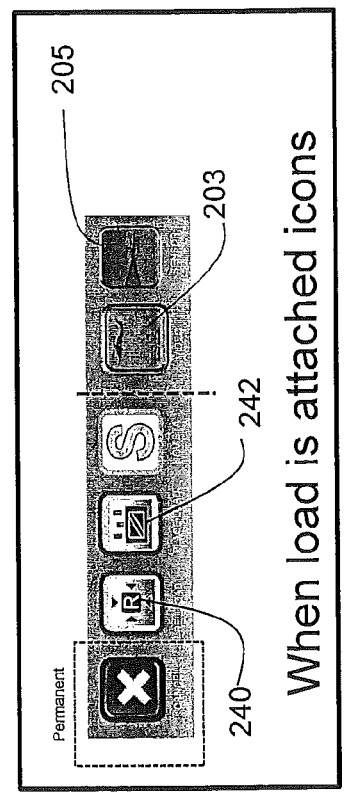

FIGS. 13, 13A and 13B depict a human-machine interface on a control device 10 in an exemplary embodiment in the hover manual mode, entered upon the selection of the video icon 203 in FIGS. 9A or 10A. This embodiment uses the same method of control as the embodiment in FIG. 9 and FIG. 10 with the exception that there is a real time video underlay on the human-machine interface.

Figure 14:
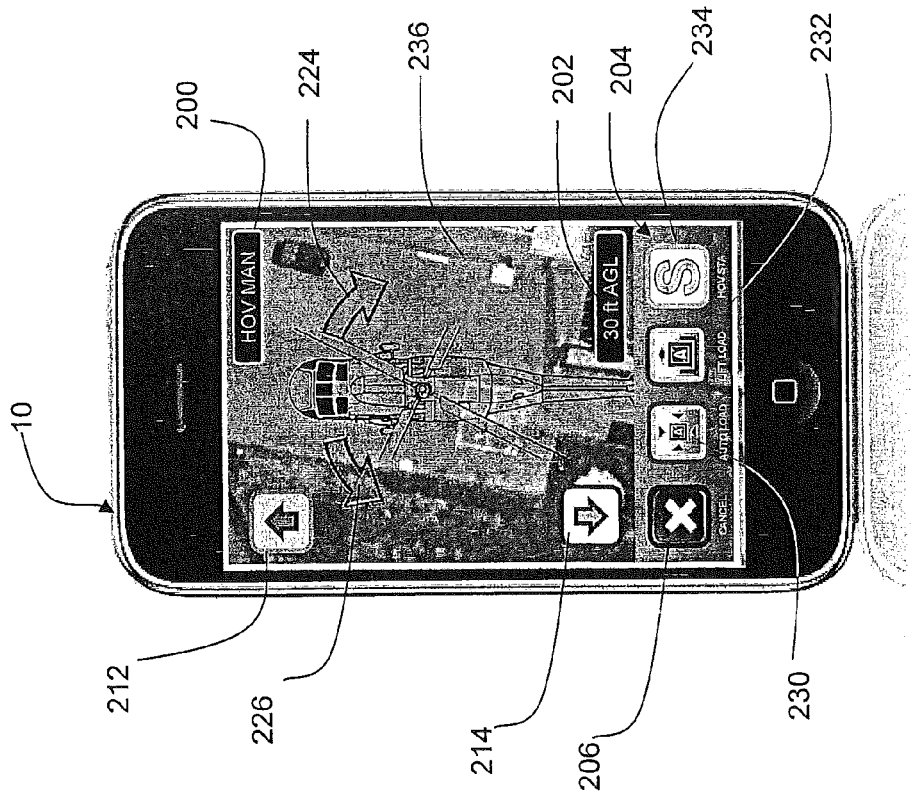
FIGS. 14, 14A and 14B depict human-machine interface on a control device in an exemplary embodiment in a hover manual mode.
Figure 14A:
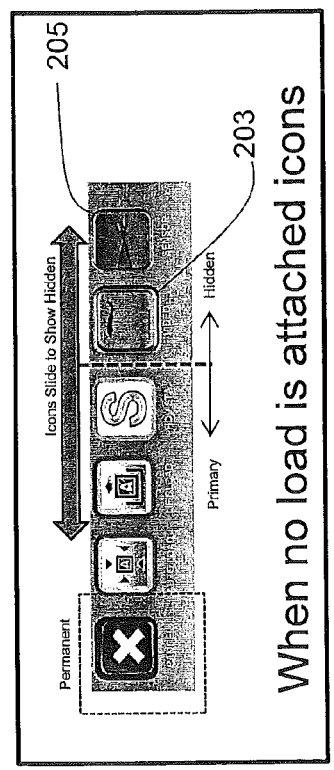
Figure 14B:
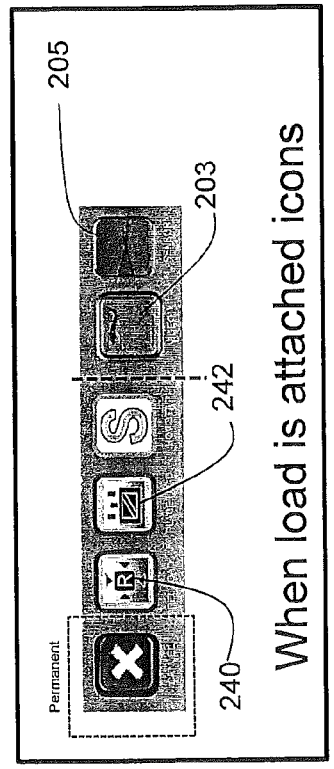

FIGS. 14, 14A and 14B depict a human-machine interface on a control device 10 in an exemplary embodiment in the hover manual mode. The command icons 204 remain the same as in the respective modes in FIG. 9A and FIG. 10A, however, position control in this embodiment is inputted into the control device 10 by clicking the desired location on screen 12 via the downward looking camera video underlay 236. Altitude and heading commands are inputted the same way as in FIG. 9 and FIG. 10, using the up 212 and down 214 icons.

Figure 15:
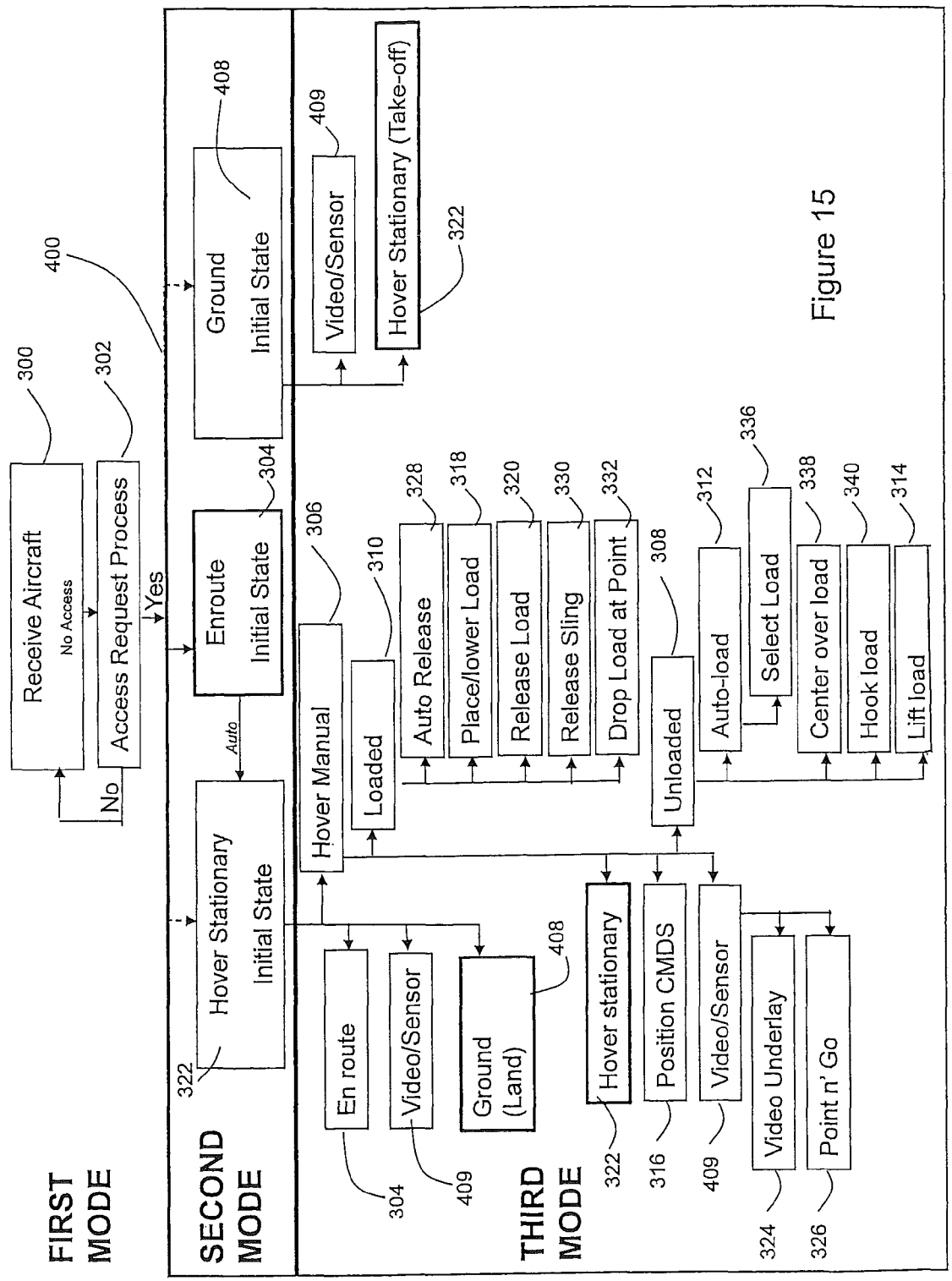
FIG. 15 is a diagram of operational states of the control device in exemplary embodiments.

FIG. 15 depicts operational states of the rotary-wing aircraft 100 and control device 10 in exemplary embodiments. Rotary-wing aircraft 100 may be manned or un-manned when control device 10 is issuing control commands to rotary-wing aircraft 100.

At 300, control device 10 receives a list of available aircraft. This list may be pulled by control device 10 or pushed to control device 10 by local aircraft requesting control. At 302, the control device 10 may query a user for an access code to ensure that only authorized users control the rotary-wing aircraft 100. Upon establishing communications between the control device 10 and the VMS 104 to receive aircraft 300 and entering the appropriate access code 302, the control device 10 is set to hover stationary mode 322, ground stationary mode 408, or enroute 304 (which will automatically transfer to hover stationary at the completion of the current flight plan leg) at 400 to reflect the actual mode of the rotary-wing aircraft 100.

From hover stationary 322, the user can enter various modes, including enroute 304, hover manual 306, or ground mode 408. Enroute mode 304 causes the rotary-wing aircraft 100 to follow a preloaded flight plan, which is implemented by VMS 104. Ground mode 408 causes the rotary-wing aircraft 100 to land and enter ground mode 408. The hover manual mode 306 allows the user to control altitude, position and heading of the rotary-wing aircraft 100 using the icons described above. Hover stationary 322 also allows user to display sensor/video data at 409.

Hover manual mode 306 also includes two command sets, unloaded 308 and loaded 310. In the unloaded mode 308, the control device 10 may be used to auto-load 312 or lift load 314. Other unloaded mode operations include but are not limited to selecting a load 336, centering over a load 338 and hooking the load 340.

In the loaded mode, the control device 10 may be used to place a load 318, release a load 320 and return to hover stationary 322. Other loaded mode operations include, but are not limited to, auto release of a load 328, release a sling 330 and dropping load at a point 332.

Hover manual mode 306 also allows transition back to hover stationary 322 or entry of flight control commands at 316. Hover manual 306 allows a user to display sensor/video data 409 in video underlay mode 324 and allows entry of flight heading by selecting points on the video underlay in a point and go mode 326, as described above with reference to FIG. 14.

Control device 10 is designed to provide a control device operator with fewer, dedicated commands that can be operated on a small, control device. Additionally, the high level of autonomy on the rotary-wing aircraft enables a more simplistic human-machine interface, not currently used today on fielded systems. The control device 10 has applications for military, civilian and commercial applications. With the widespread use of smart devices (e.g., by military personnel), embodiments offer the opportunity to utilize these smart devices to host control applications for rotary-wing aircraft in a myriad of applications.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A control system for portable control of a rotary-wing aircraft, the control system comprising:
    a portable, hand-held, control device executing a control application, the control device operating in a loaded mode when a load is attached to the rotary-wing aircraft and an unloaded mode when no load is attached to the rotary-wing aircraft, the control device presenting command icons in response to being in loaded mode and unloaded mode;
    a vehicle management system in the rotary-wing aircraft;
    a sensor package on the rotary-wing aircraft; and
    a communication system providing communications between the control device and the rotary-wing aircraft, vehicle management system and sensor package;
    wherein the control device communicates commands to the vehicle management system to implement loading and unloading of the rotary-wing aircraft;
    wherein the control device executes a receive aircraft mode, hover mode, en-route mode and ground mode, wherein in the receive aircraft mode, the control device presents a list of aircraft within range of the control device and available for control by the control device, wherein in the hover mode, the control device presents icons to control the rotary-wing aircraft in a hover flight, wherein in the en route mode, the control device commands the rotary-wing aircraft to follow a preloaded flight plan and wherein in the ground mode, the control device commands the rotary-wing aircraft to land.

2. The control system of claim 1 wherein:
    the communication system includes a wireless router in communication with the control device and a data link coupled to the wireless router;
    the rotary-wing aircraft including a second data link in communication with the data link and coupled to the vehicle management system.

3. The control system of claim 1 wherein:
    the communication system includes a cellular network in communication with the control device;
    the rotary-wing aircraft including a cellular network modem in communication with the cellular network and coupled to the vehicle management system.

4. The control system of claim 1 wherein:
    the communication system includes a data link coupled directly to the control device;
    the rotary-wing aircraft including a second data link in communication with the data link and coupled to the vehicle management system.

5. The control system of claim 1 wherein:
    the communication system includes a communication element within the control device;
    the rotary-wing aircraft including a wireless router in communication with the communication element and coupled to the vehicle management system.

6. The control system of claim 1 wherein:
    the hover mode includes a hover stationary mode and a hover manual mode.

7. The control system of claim 6 wherein:
    in hover manual mode, the control device presents flight control icons for controlling the rotary-wing aircraft.

8. The control system of claim 7 wherein:
    the flight control icons include altitude icons for controlling altitude of the rotary-wing aircraft.

9. The control system of claim 7 wherein:
    the flight control icons include position icons for controlling position of the rotary-wing aircraft.

10. The control system of claim 7 wherein:
    the flight control icons include heading icons for controlling a heading of the rotary-wing aircraft.

11. The control system of claim 6 wherein:
    in hover manual mode, the control device presents command icons for initiating an operation by the rotary-wing aircraft.

12. The control system of claim 11 wherein:
    in hover manual mode, the command icons include a cancel icon for terminating active command of the rotary-wing aircraft and transitioning to a stable state.

13. The control system of claim 11 wherein:
    in hover manual mode, the command icons include a hover stationary icon for instructing the rotary-wing aircraft to hover at a fixed position.

14. The control system of claim 11 wherein:
    in hover manual mode and no load detected attached to the rotary-wing aircraft, the command icons comprise a video/sensor icon for initiating display on the control device of real-time streaming footage from the rotary-wing aircraft for situational awareness, auto load, select load, center over load, hook load, and lift load.

15. The control system of claim 11 wherein:
    in hover manual mode and a load detected attached to the rotary-wing aircraft, the command icons comprise a video/sensor icon for initiating display on the control device of real-time streaming footage from the rotary-wing aircraft for situational awareness, auto release load, place/lower load, release load, release sling, and drop load at point.

16. The control system of claim 1 wherein: the ground mode includes a ground stationary mode and a ground manual mode.

17. The control system of claim 1 wherein:
    in ground mode, the command icons comprise video/sensor icons for initiating display on the control device of real-time streaming footage from the rotary-wing aircraft for situational awareness.

18. The control system of claim 1 wherein:
in ground mode, the command icons include take off vertically to a predetermined altitude.

19. A portable, hand-held, control device for portable control of a rotary-wing aircraft, the control device comprising:
a display;
a wireless communication device for communications with at least one of a vehicle management system and a sensor package on the rotary-wing aircraft; and
a processor executing a control application, the control application operating in a loaded mode when a load is attached to the rotary-wing aircraft and an unloaded mode when no load is attached to the rotary-wing aircraft, the processor presenting command icons on the display in response to being in loaded mode and unloaded mode;
wherein the processor communicates commands from the wireless communication device to the vehicle management system to implement loading and unloading of the rotary-wing aircraft;
wherein the control device executes a receive aircraft mode, hover mode, en-route mode and ground mode, wherein in the receive aircraft mode, the control device presents a list of aircraft within range of the control device and available for control by the control device, wherein in the hover mode, the control device presents icons to control the rotary-wing aircraft in a hover flight, wherein in the en route mode, the control device commands the rotary-wing aircraft to follow a preloaded flight plan and wherein in the ground mode, the control device commands the rotary-wing aircraft to land.

* * * * *